US007484854B2

(12) United States Patent
Miyasaka (10) Patent No.: US 7,484,854 B2
(45) Date of Patent: Feb. 3, 2009

(54) PROJECTOR AND PATTERN IMAGE DISPLAY METHOD

(75) Inventor: Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 485 days.

(21) Appl. No.: 11/082,056

(22) Filed: Mar. 17, 2005

(65) Prior Publication Data

US 2005/0231820 A1 Oct. 20, 2005

(30) Foreign Application Priority Data

Mar. 19, 2004 (JP) ............................. 2004-080486

(51) Int. Cl.
*G03B 21/14* (2006.01)
*H04N 3/22* (2006.01)
*G01C 3/08* (2006.01)
*G01B 11/14* (2006.01)

(52) U.S. Cl. ..................... 353/101; 353/69; 348/745; 356/4.03; 356/4.04; 356/4.05; 356/622

(58) Field of Classification Search ............... 353/69, 353/70, 100, 101, 122; 348/745–747; 356/4.01–4.05, 356/4.07–4.09, 616–622
See application file for complete search history.

(56) References Cited

U.S. PATENT DOCUMENTS 5,828,503 A * 10/1998 Kaneda et al. .............. 359/824

| 6,485,147 | B2 * | 11/2002 | Liang ........................ 353/101 |
| 6,592,228 | B1 * | 7/2003 | Kawashima et al. ......... 353/101 |
| 7,236,256 | B2 * | 6/2007 | Yamaguchi ................. 356/603 |
| 2003/0174293 | A1 * | 9/2003 | Hubel et al. .................. 353/84 |
| 2005/0024606 | A1 * | 2/2005 | Li et al. ....................... 353/121 |
| 2005/0157270 | A1 * | 7/2005 | Muraoka et al. .............. 353/70 |

FOREIGN PATENT DOCUMENTS

JP  A 2000-241874  9/2000
JP  A-2002-247614  8/2002

* cited by examiner

*Primary Examiner*—Diane I Lee
*Assistant Examiner*—Magda Cruz
(74) *Attorney, Agent, or Firm*—Oliff & Berridge, PLC (57) ABSTRACT

An appropriate adjustment can be made on the basis of a gradation amplitude obtained from a photographing image even when the zoom position of a zoom lens is changed. According to exemplary embodiments a CPU obtains a zoom amount transmitted from a zoom lens position detecting section, and derives the width of a stripe element in a pattern image to be formed on a liquid crystal light valve on the basis of the obtained zoom amount by referring to a stripe element width table stored to a stripe element width table storing section. The CPU corrects the pattern image for an adjustment on the basis of the derived stripe element width and rewrites the contents of a pattern image memory and gives instructions of image projection to an image processing section, a liquid crystal light valve driving section, etc. Thus, the pattern image corrected with respect to the stripe element width is formed on the liquid crystal light valve.

3 Claims, 7 Drawing Sheets

PROJECTOR AND PATTERN IMAGE DISPLAY METHOD

BACKGROUND

Exemplary embodiments of the present invention relate to a projector for displaying an image by projecting projection light to a projection object such as a screen. Exemplary embodiments further relate to a projector having a zoom lens able to change the size of a projection light range projected by the projection light, and an image pickup portion for photographing the projection object.

In related art projectors, the zoom lens is installed as a projection lens. The zoom position of the zoom lens is changed by operating this zoom lens so that the size of the projection light range formed on the screen can be freely changed.

Further, when such a projector is arranged in front of the screen, it is necessary to make various adjustments such as a zoom adjustment, a keystone correction, a focus adjustment, etc. in the projector in advance so as to appropriately display the image on the screen by the projection light projected from the projector to the screen.

However, in the case of a portable projector, there is a possibility that the relative position with the screen is changed every time the projector is arranged. Therefore, a user must make the above-mentioned various kinds of complicated adjustments every time.

Therefore, for example, a monitor camera is arranged in the projector as described in related art document JP-A-2000-241874. When this projector is arranged in front of the screen, a pattern image for an adjustment is first projected and displayed on the screen by the projector. The screen for displaying this pattern image is photographed by the monitor camera, and its photographing image is analyzed. The above-mentioned various kinds of adjustments are automatically made on the basis of this analyzed result.

SUMMARY

However, in the projector having the zoom lens and monitor camera, the following problems are caused by changing the size of the pattern image for an adjustment projected in the photographing image when the size of the projection light range on the screen is changed by changing the zoom position of the zoom lens.

For example, a case for making the focus adjustment among the above-mentioned various kinds of adjustments will be considered. In the projector, when the focus adjustment is made, an image of a longitudinal stripe or a transversal stripe constructed by arranging plural stripe elements formed by a white color band and a black color band, is prepared as the pattern image for an adjustment. This image is projected and displayed on the screen, and the screen for displaying this pattern image is photographed by the monitor camera.

On the screen, the displayed range of this pattern image for an adjustment becomes the projection light range. When the gradation value of each picture element arranged in the direction perpendicular to the direction of the stripe (the longitudinal direction of each stripe element) in the projected pattern image is obtained in the photographing image obtained by the photographing, the picture element of a white color portion has a high gradation value and the picture element of a black color portion has a low gradation value. As its result, a gradation waveform having a spatial frequency according to the width of the stripe element is obtained along the above perpendicular direction. The gradation amplitude represented as the difference between a maximum value and a minimum value of this gradation waveform is changed in accordance with a focus degree of the pattern image on the screen. Namely, when it is focused, this gradation amplitude is increased.

In contrast to this, when the focus is shifted, this gradation amplitude is reduced. Therefore, the photographing image is analyzed and its gradation amplitude is derived. The focus adjustment is automatically made by operating the focus lens within the projection lens on the basis of this gradation amplitude.

However, when the size of the projection light range on the screen is changed by changing the zoom position of the zoom lens, the size of the pattern image projected in the photographing image is also changed and the width of each stripe element constituting the stripe is also changed.

Figure 10A:
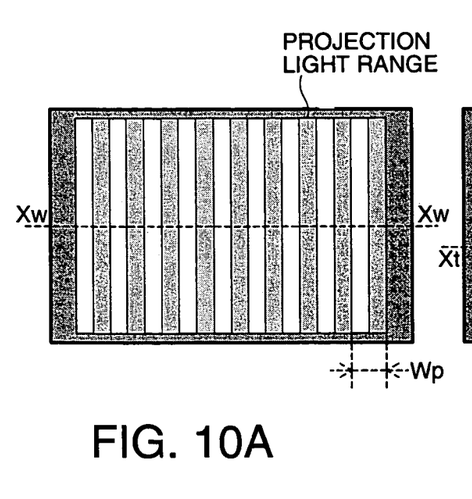
FIGS. 10A-B are schematics showing the change of the photographing image when the zoom position is changed in the related art case.
Figure 10B:
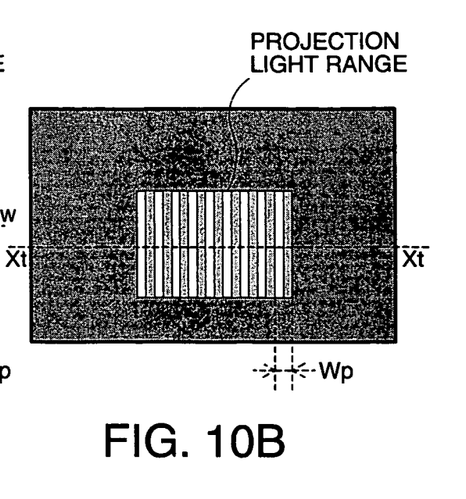
Figure 11A:
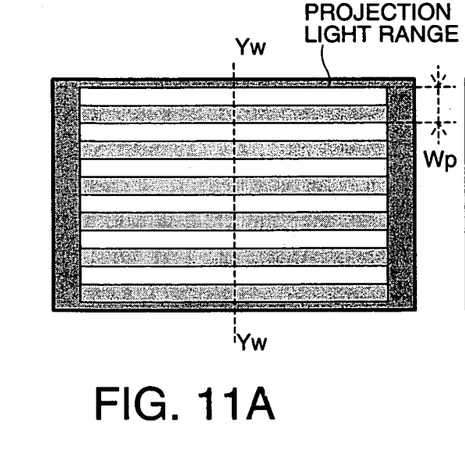
FIGS. 11A-B are schematics showing the change of the photographing image when the zoom position is changed in the related art case.
Figure 11B:
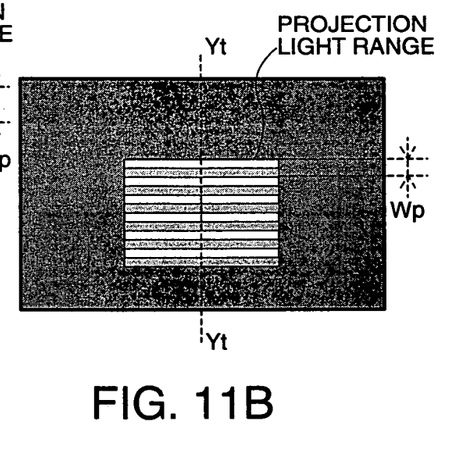

FIGS. 10A-B and 11A-B respectively are schematics showing a change of the photographing image when the zoom position is changed in accordance with the related art. FIGS. 10A-B shows a case using the image of the longitudinal stripe as the pattern image for an adjustment, and FIGS. 11A-B shows a case using the image of the transversal stripe.

In these figures, FIG. 10A shows the photographing image when the zoom position of the zoom lens is set to the wide side. FIG. 10B shows the photographing image when the zoom position of the zoom lens is set to the telescopic side.

For example, when the zoom position of the zoom lens is set to the wide side, the pattern image projected in the photographing image is increased in size as shown in FIG. 10A or 11A. The width Wp of each stripe element is also widened in accordance with this increase. In contrast to this, when the zoom position of the zoom lens is set to the telescopic side, the pattern image projected in the photographing image is reduced in size as shown in FIG. 10B or 11B. The width Wp of each stripe element is also narrowed in accordance with this reduction.

Figure 12A:
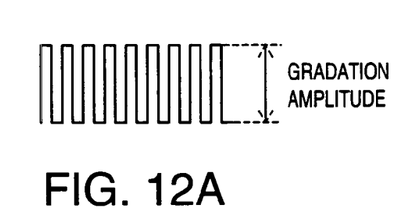
FIGS. 12A-B are schematic waveform diagrams showing the gradation waveform showing a spatial change of the gradation value of each picture element arranged along the Xt-Xt direction in FIG. 10B or the Yt-Yt direction in FIG. 11B.
Figure 12B:
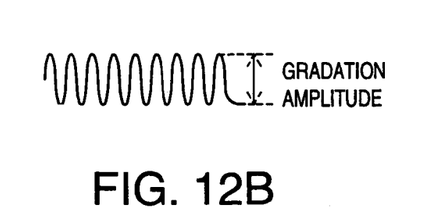

FIGS. 12A-B is a waveform diagram showing a gradation waveform showing a spatial change of the gradation value of each picture element arranged along the Xt-Xt direction in FIG. 10B or the Yt-Yt direction in FIG. 11B. FIG. 12A shows the waveform when it is focused. FIG. 12B shows the waveform when the focus is shifted.

As shown in FIG. 10B or 11B, when the zoom position is set to the telescopic side, the width Wp of each stripe element is moderately narrow and becomes a predetermined desirable width. Therefore, as shown in FIGS. 12A-B, the gradation waveform showing the spatial change of the gradation value of each picture element arranged along the Xt-Xt direction in FIG. 10B or the Yt-Yt direction in FIG. 11B moderately becomes high in the spatial frequency (i.e., the waveform period moderately becomes short). Accordingly, when it is focused, the gradation amplitude is large as shown in FIG. 12A. In contrast to this, when the focus is slightly shifted, the gradation amplitude becomes small as shown in FIGS. 12B. Accordingly, if this gradation amplitude is detected, it is possible to grasp the focus degree of the pattern image on the screen. Therefore, when the focus is shifted, it can be focused by controlling the operation of the focus lens within the projection lens so as to increase this gradation amplitude.

Figure 13A:
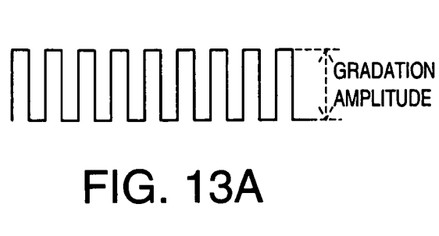
FIGS. 13A-B are waveform diagrams showing the gradation waveform showing a spatial change of the gradation value of each picture element arranged along the Xw-Xw direction in FIG. 10A or the Yw-Yw direction in FIG. 11A.
Figure 13B:
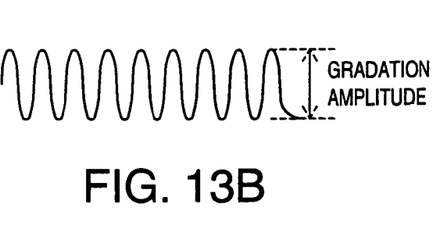

In contrast to this, FIG. 13 is a waveform diagram showing the gradation waveform showing the spatial change of the gradation value of each picture element arranged along the Xw-Xw direction in FIG. 10A or the Yw-Yw direction in FIG. 11A. Similar to FIGS. 12A-B, FIG. 13A shows the waveform when it is focused. FIG. 13B shows the waveform when the focus is shifted.

As shown in FIG. 10A or 11A, when the zoom position is set to the wide side, the width of each stripe element is considerably wide in comparison with a predetermined desirable width. Therefore, the gradation waveform showing the spatial change of the gradation value of each picture element arranged along the Xw-Xw direction in FIG. 10A or the Yw-Yw direction in FIG. 11A becomes low in the spatial frequency (i.e., the waveform period becomes long) as shown in FIGS. 13A-B. Therefore, even when the focus is slightly shifted, the gradation amplitude is large as it is as shown in FIG. 13B similarly to the case in (FIG. 13A), in which it is focused. Accordingly, even when this gradation amplitude is detected, no focus degree of the pattern image on the screen can be sufficiently grasped. Even if the focus is shifted, it is difficult to conform this focus.

As explained above, when the size of the projection light range on the screen is changed by changing the zoom position of the zoom lens, the size of the pattern image for an adjustment projected in the photographing image is changed. Accordingly, the size (i.e., the width of the stripe element constituting the stripe) of an image element constituting this pattern image is also changed. Therefore, a problem exists in that no appropriate adjustment can be made even when the focus adjustment is made on the basis of the gradation amplitude obtained from this photographing image.

Such a problem might be also caused in another adjustment as well as the focus adjustment.

Accordingly, exemplary embodiments of the present invention address and/or solve the above discussed and/or other problems of the related art. Exemplary embodiments provide a technique able to appropriately make the adjustment on the basis of the gradation amplitude obtained from the photographing image even when the zoom position of the zoom lens is changed.

To address at least one portion of the above discussed and/or other problems, exemplary embodiments of the present invention essentially reside in a projector for displaying an image by projecting projection light to a projection object and including:

an image forming section able to form an image constructed by arranging plural image elements as a pattern image for the display in said projection object;

a zoom lens able to change the size of a projection light range projected by said projection light;

a zoom lens position detecting section for detecting the zoom position of said zoom lens;

a control section; and a photographing section for photographing said projection objects. The control section obtains the zoom position detected by the zoom lens position detecting section, and the size of the image element in the pattern image formed in the image forming section is changed in accordance with the obtained zoom position.

Thus, in the projector of exemplary embodiments of the present invention, the size of the image element in the pattern image formed in the image forming section is changed in accordance with the zoom position of the zoom lens. Accordingly, for example, when the size of the image element in the pattern image formed in the image forming section is changed so as to be reduced as the zoom position is located on the wide side, the size of the projected pattern image is increased in the photographing image when the zoom position is set to the wide side. However, the size of the image element constituting this pattern image is not increased, but can be approximately constantly held at a predetermined desirable size. In contrast to this, when the size of the image element in the pattern image formed in the image forming section is changed so as to be increased as the zoom position is located on the telescopic side, the size of the projected pattern image is reduced in the photographing image when the zoom position is set to the telescopic side. However, the size of the image element constituting this pattern image is not reduced, but can be approximately constantly held at a predetermined desirable size.

Accordingly, the spatial frequency can be moderately raised in the gradation waveform showing a spatial change of the gradation value of each picture element arranged in a predetermined direction in the photographing image even when the zoom position is located on the wide side and the telescopic side. Therefore, the adjusting degree of the pattern image displayed in the projection object can be precisely grasped by detecting the gradation amplitude derived from this gradation waveform. Accordingly, an appropriate adjustment can be made on the basis of the gradation amplitude obtained from the photographing image even when the zoom position of the zoom lens is changed.

In the projector of exemplary embodiments of the present invention, the control section may change the width of the stripe element in the pattern image formed in the image forming section in accordance with the obtained zoom position when the image element is a stripe element constructed by a band of a first color and a band of a second color and the pattern image is an image of a stripe constructed by arranging a plurality of the stripe elements.

Such a pattern image is suitably used to make the focus adjustment. When the zoom position of the zoom lens is changed, the width of each stripe element constituting this pattern image can be approximately constantly held at a predetermined desirable width even when the size of the projected pattern image for an adjustment is changed in the photographing image by changing the width of the stripe element in this pattern image formed in the image forming section in accordance with this zoom position. Therefore, an appropriate focus adjustment can be made on the basis of the gradation amplitude obtained from this photographing image.

The projector of exemplary embodiments of the present invention may further include a focus lens able to focus the image displayed in the projection object. The control section may derive a gradation amplitude from a gradation waveform showing a spatial change of the gradation value of each picture element arranged along a predetermined direction in the photographing image photographed and obtained by the image pickup section when the pattern image formed in the image forming section is displayed in the projection object, and the control section may control the operation of the focus lens on the basis of the derived gradation amplitude.

The focus adjustment can be easily made by such a construction using the pattern image displayed in the projection object.

Exemplary embodiments of the present invention are not limited to the above modes of the device invention of the projector, etc., but can be also realized in modes as a method invention as in a method for displaying a predetermined pattern image in the projection object, etc. in the projector.

DETAILED DESCRIPTION OF EXEMPLARY EMBODIMENTS

The exemplary embodiment modes of the present invention will next be explained in the following order on the basis of the exemplary embodiments.

Figure 1:
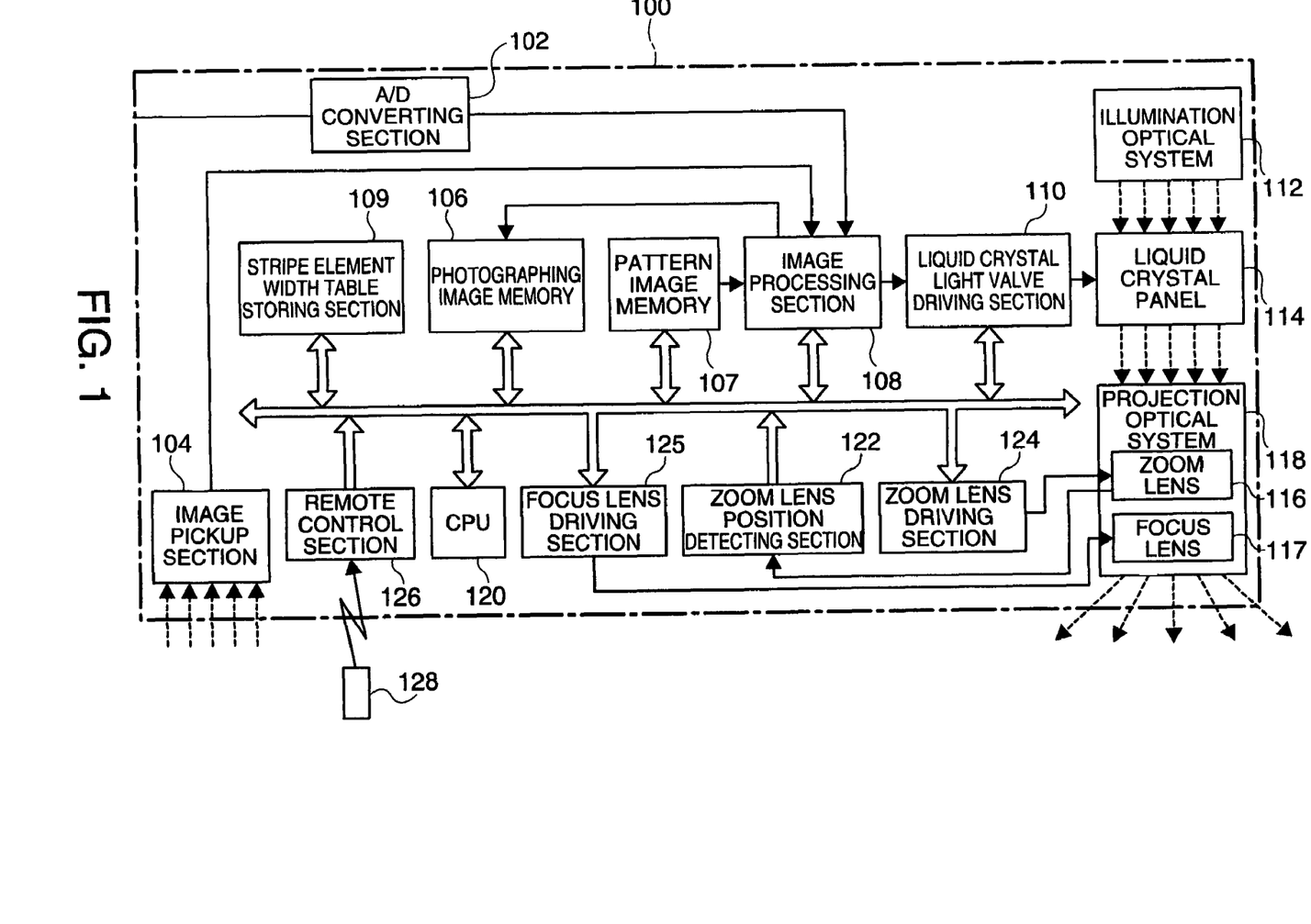
FIG. 1 is a schematic showing the construction of a projector as one exemplary embodiment of the present invention.

1. Construction of projector:
2. Image projecting operation:
3. Pattern image variable operation:
4. Concrete Examples:
5. Effects of the exemplary embodiments:
6. Modified Examples:
6-1. Modified Example 1:
6-2. Modified Example 2:
6-3. Modified Example 3:
6-4. Modified Example 4:
1. Construction of Projector:

FIG. 1 is a schematic showing the construction of a projector as one exemplary embodiment of the present invention. This projector 100 is a projector having a portable property. As shown in FIG. 1, the projector 100 has an A/D converting section 102, an image pickup section 104, a photographing image memory 106, a pattern image memory 107, an image processing section 108, a stripe element width table storing section 109, a liquid crystal light valve driving section 110, an illumination optical system 112, a liquid crystal light valve 114, a projection optical system 118 having a zoom lens 116 and a focus lens 117, a CPU 120, a zoom lens position detecting section 122, a zoom lens driving section 124, a focus lens driving section 125, a remote control section 126 and a remote control 128. The CPU 120 corresponds to a control section in the claims. The liquid crystal light valve 114 as an electro-optical device corresponds to an image forming section in the claims.

In FIG. 1, the CPU 120 is drawn such that the CPU 120 is connected to only the photographing image memory 106, the pattern image memory 107, the image processing section 108, the stripe element width table storing section 109, the liquid crystal light valve driving section 110, the zoom lens position detecting section 122, the zoom lens driving section 124, the focus lens driving section 125 and the remote control section 126 through buses. However, in reality, the CPU 120 is also connected to other constructional portions. The image pickup section 104 has a CCD and constitutes a CCD module as a monitor camera. The stripe element width table storing section 109 stores a stripe element width table described later. For example, the zoom lens position detecting section 122 can be constructed by a zoom encoder, etc.

In this exemplary embodiment, the image pickup section 104 shown in FIG. 1 corresponds to an image pickup section described in the claims. The liquid crystal light valve 114 corresponds to an image forming section described in the claims. The zoom lens 116 corresponds to a zoom lens described in the claims. The focus lens 117 corresponds to a focus lens described in the claims. The zoom lens position detecting section 122 corresponds to a zoom lens position detecting section described in the claims. The CPU 120 corresponds to a control section in the claims.

2. Image Projecting Operation:

The image projecting operation as a normal operation in the projector 100 will first be explained briefly.

In FIG. 1, when a user gives instructions of the start of image projection by using the remote control 128, the remote control 128 transmits these inputted instructions to the remote control section 126 by wireless communication. The remote control section 126 transmits the instructions from the remote control 128 to the CPU 120 through a bus. The CPU 120 performs the image projecting operation by controlling the operation of each constructional portion including the image processing section 108 on the basis of these instructions.

First, the A/D converting section 102 inputs an image signal outputted from a video player, a television set, a DVD player, etc., and an image signal outputted from a personal computer, etc., and converts these analog image signals into digital image signals, and outputs these digital image signals to the image processing section 108. The image processing section 108 adjusts the inputted digital image signals such that a display state (e.g., brightness, contrast, synchronization, tracking, color density, a color tone, etc.) of the image becomes a predetermined desirable state. The image processing section 108 then outputs the adjusted digital image signals to the liquid crystal light valve driving section 110.

The liquid crystal light valve driving section 110 operates the liquid crystal light valve 114 on the basis of the inputted digital image signals. Thus, the liquid crystal light valve 114 modulates illumination light emitted from the illumination optical system 112 in accordance with the image information. The projection optical system 118 is attached to the front face of a box body of the projector 100, and projects the projection light modulated by the liquid crystal light valve 114 to an unillustrated screen. Thus, the image is projected and displayed on the screen.

3. Pattern Image Variable Operation:

The pattern image variable operation as a characteristic portion of exemplary embodiments of the present invention in the projector 100 will next be explained in detail.

As mentioned above, the pattern image for an adjustment formed on the liquid crystal light valve was constant in the related art. However, in this exemplary embodiment, the width of a stripe element in the pattern image for an adjustment formed on the liquid crystal light valve is changed in accordance with the zoom position so as to appropriately make the focus adjustment on the basis of a gradation amplitude obtained from a photographing image even when the zoom position of the zoom lens 116 is changed.

Therefore, when the user arranges the projector 100 in a predetermined desirable position in front of the screen and then turns on a power source of the projector 100, the projector 100 projects and displays the pattern image for an adjustment on the screen to make e.g., the focus adjustment.

Concretely, when the CPU 120 generates the pattern image for an adjustment and writes the pattern image to the pattern image memory 107 as a digital image signal and gives instructions of the image projection to the image processing section 108, the liquid crystal light valve driving section 110, etc., the image processing section 108 reads the written digital image signal and outputs this digital image signal to the liquid crystal light valve driving section 110. The liquid crystal light valve driving section 110 operates the liquid crystal light valve 114 on the basis of the inputted digital image signal and forms the pattern image for an adjustment as described later onto the liquid crystal light valve 114. The liquid crystal light valve 114 modulates the illumination light emitted from the illumination optical system 112 in accordance with this formed pattern image. The projection optical system 118 projects the projection light modulated by the liquid crystal light valve 114 to the screen through the zoom lens 116, etc. Thus, the pattern image for an adjustment is displayed on the screen. A displayed range of this pattern image for an adjustment becomes a projection light range on the screen.

In this exemplary embodiment, the image of a longitudinal stripe or a transversal stripe constructed by arranging plural stripe elements formed by a white color band and a black color band is used as the pattern image for an adjustment.

Thus, when the pattern image is displayed on the screen and the user then next gives instructions of a movement of the zoom position by operating an unillustrated zoom button of the remote control 128 so as to adjust the size of the projection light range on the screen, the remote control 128 transmits these inputted instructions to the remote control section 126 by wireless communication. The remote control section 126 transmits the instructions from the remote control 128 to the CPU 120 through a bus. The CPU 120 operates the zoom lens 116 arranged in the projection optical system 118 by controlling the operation of the zoom lens driving section 124 on the basis of these instructions, and moves the zoom position of the zoom lens 116. Thereafter, when the projection light range on the screen becomes a predetermined desirable size and the user gives instructions of moving stoppage of the zoom position by operating the zoom button of the remote control 128, the CPU 120 stops the movement of the zoom position of the zoom lens 116 by controlling the operation of the zoom lens driving section 124 on the basis of these instructions. At this time, the zoom lens position detecting section 122 detects the zoom position of the zoom lens 116 and transmits its detecting result to the CPU 120 as a zoom amount. In this exemplary embodiment, the zoom amount is set to "0" when the zoom position is located in the most end portion of the wide side. Further, the zoom amount is set to "255" when the zoom position is located in the most end portion of the telescopic side.

The CPU 120 also reads and executes a pattern image variable processing program from an unillustrated memory. Concretely, the CPU 120 performs a variable operation of the pattern image by controlling the operation of each constructional portion including the pattern image memory 107 in accordance with the processing procedure shown in FIG. 2.

Figure 2:
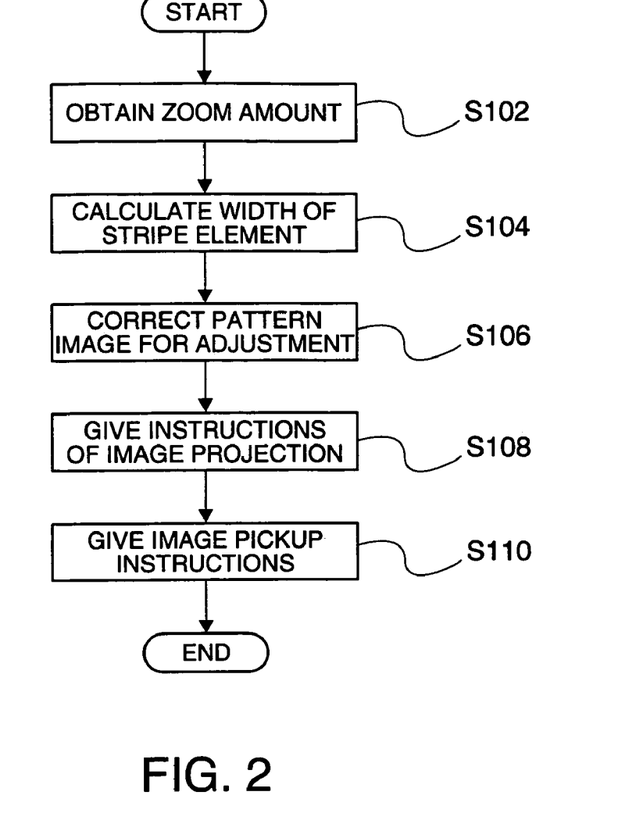
FIG. 2 is a flow chart showing the processing procedure of pattern image variable processing in the projector of FIG. 1.

FIG. 2 is a flow chart showing the processing procedure of the pattern image variable processing in the projector of FIG. 1.

When the processing shown in FIG. 2 is started, the CPU 120 obtains the zoom amount transmitted from the zoom lens position detecting section 122 (step S102), and derives the width of a stripe element in the pattern image to be formed on the liquid crystal light valve 114 on the basis of the obtained zoom amount with reference to a stripe element width table stored to the stripe element width table storing section 109 (step S104). Here, the obtained zoom amount is set to Z and the derived stripe element width is set to Wq.

As the stripe element width table stored to the stripe element width table storing section 109, for example, the stripe element width Wq according to the zoom amount Z is calculated or actually measured every zoom amount Z in advance such that the stripe element width Wp in the pattern image for an adjustment projected in the photographing image is approximately constantly set to a predetermined desirable width irrespective of the change of the zoom amount Z, and its obtained result is summarized.

Figure 3:
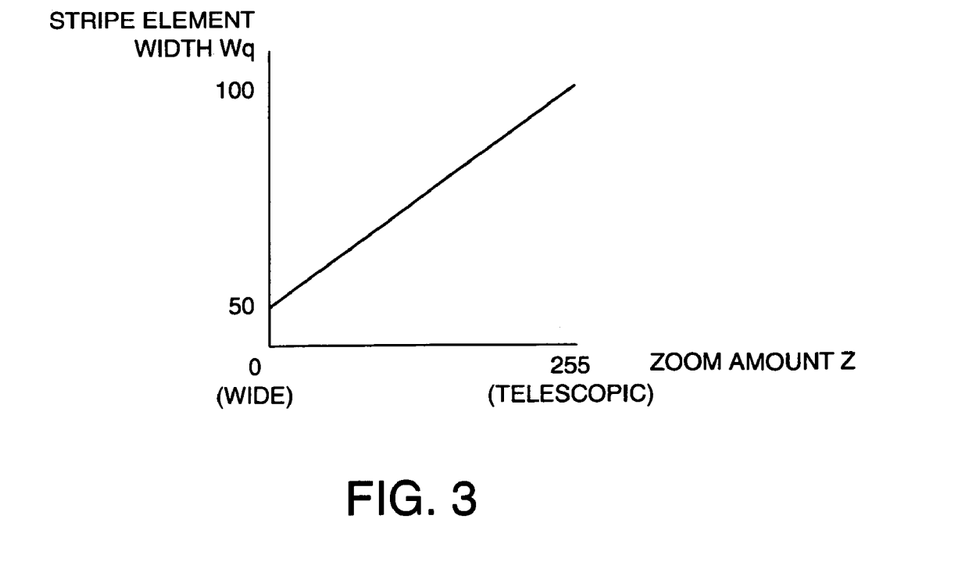
FIG. 3 is a graph showing the relation of a zoom amount Z and a stripe element width Wq in a stripe element width table.

FIG. 3 is a graph showing the relation of the zoom amount Z and the stripe element width Wq in such a stripe element width table.

As shown in FIG. 3, the stripe element width Wq is widened from "50" to "100" in proportion to an increase in the zoom amount Z from "0" to "255". Namely, the stripe element width Wq is narrowed as the zoom position of the zoom lens 116 is located on the wide side. The stripe element width Wq is widened as the zoom position of the zoom lens 116 is located on the telescopic side.

Next, on the basis of the derived stripe element width Wq, the CPU 120 corrects the pattern image for an adjustment and rewrites the contents of the pattern image memory 107 (step S106) and gives instructions of the image projection to the image processing section 108, the liquid crystal light valve driving section 110, etc. (step S108). Thus, the pattern image corrected to Wq in the stripe element width is formed on the liquid crystal light valve 114.

Figure 4A:
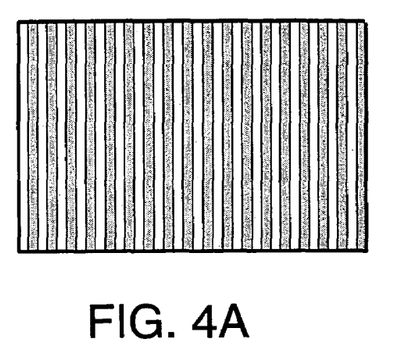
FIGS. 4A-B are schematics showing the change of a pattern image formed on a liquid crystal light valve 114 when a zoom position is changed in one exemplary embodiment of the present invention.
Figure 4B:
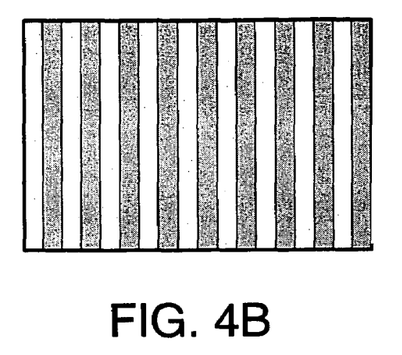
Figure 5A:
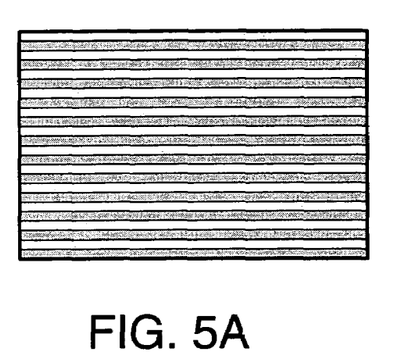
FIGS. 5A-B are schematics showing the change of the pattern image formed on the liquid crystal light valve 114 when the zoom position is changed in one exemplary embodiment of the present invention.
Figure 5B:
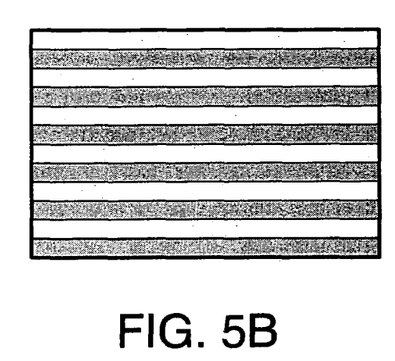

FIGS. 4A-B and 5A-B are respectively schematics showing a change of the pattern image formed on the liquid crystal light valve 114 when the zoom position is changed in this exemplary embodiment. FIGS. 4A-B show this change in a case using the image of a longitudinal stripe as the pattern image for an adjustment. FIGS. 5A-B show this change in a case using the image of a transversal stripe as the pattern image for an adjustment.

In these figures, each of FIGS. 4A and 5A show the pattern image when the zoom position of the zoom lens is set to the wide side. Each of FIGS. 4B and 5B show the pattern image when the zoom position of the zoom lens is set to the telescopic side.

Accordingly, for example, when the zoom position of the zoom lens 116 is set to the wide side, the stripe element width Wq is narrowed as shown in FIG. 4A or 5A as the pattern image formed on the liquid crystal light valve 114. The number of stripe elements is correspondingly corrected so as to be increased.

In contrast to this, when the zoom position is set to the telescopic side, the stripe element width Wq is widened as shown in FIG. 4B or 5B as the pattern image formed on the liquid crystal light valve 114. The number of stripe elements is correspondingly corrected so as to be decreased.

The liquid crystal light valve 114 modulates the illumination light in accordance with this corrected pattern image, and the projection optical system 118 projects this modulated projection light to the screen. Thus, the corrected pattern image is displayed on the screen.

On the other hand, the CPU 120 gives photographing instructions to the image pickup section 104 (step S110), and terminates the pattern image variable processing shown in FIG. 2. Thus, the image pickup section 104 photographs the screen on which the pattern image is displayed. The image pickup section 104 then outputs the obtained photographing image to the image processing section 108 as a digital image signal. The image processing section 108 performs predetermined desirable processing with respect to the inputted digital image signal, and then writes the processed image signal to the photographing image memory 106 and updates its contents.

Thereafter, the CPU 120 reads the digital image signal from the photographing image memory 106 and obtains the photographing image, and derives a gradation amplitude from a gradation waveform by analyzing its photographing image. The CPU 120 then operates the focus lens 117 arranged in the projection optical system 118 by controlling the operation of the focus lens driving section 125 on the basis of the derived gradation amplitude, and automatically makes the focus adjustment. As mentioned above, the gradation waveform is a waveform showing a spatial change of the gradation value of each picture element arranged along the direction perpendicular to the direction (longitudinal direction of each stripe element) of the stripe in the pattern image projected in the photographing image. The gradation amplitude is the difference between a maximum value and a minimum value in this gradation waveform. The gradation amplitude is changed in accordance with the focus degree of the pattern image on the screen, and is reduced when the focus is shifted. Accordingly, when the focus is shifted, the CPU 120 can concretely focus the focus lens 117 by operating the focus lens 117 by controlling the operation of the focus lens driving section 125 so as to increase the gradation amplitude.

Figures 6A, 6B:
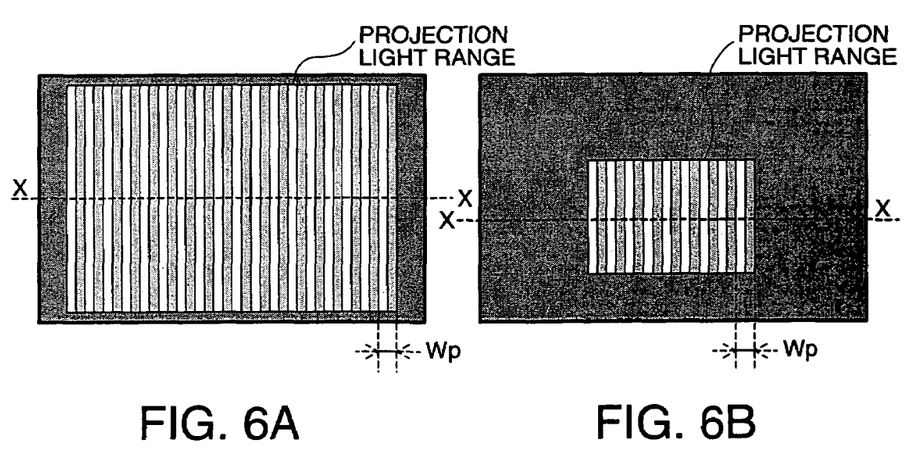
FIGS. 6A-B are schematics showing the change of a photographing image when the zoom position is changed in one exemplary embodiment of the present invention.
Figure 7A:
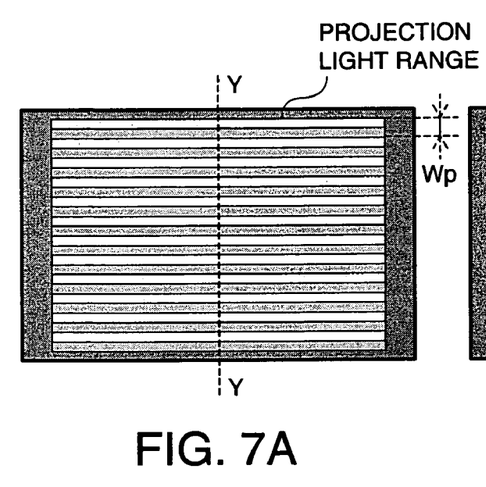
FIGS. 7A-B are schematics showing the change of the photographing image when the zoom position is changed in one exemplary embodiment of the present invention.
Figure 7B:
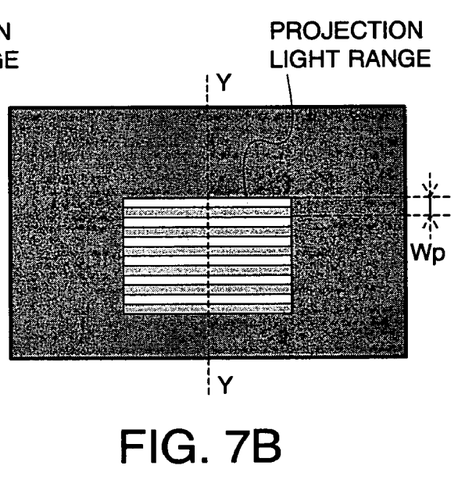

FIGS. 6A-B and 7A-B are respectively schematics, showing the change of the photographing image when the zoom position is changed in this exemplary embodiment. FIGS. 6A-B show this change in a case using the image of a longitudinal stripe as the pattern image for an adjustment. FIGS. 7A-B show this change in a case using the image of a transversal stripe as the pattern image for an adjustment.

In these figures, each of FIGS. 6A and 7A show the photographing image when the zoom position of the zoom lens is set to the wide side. Each of FIGS. 6B and 7B show the photographing image when the zoom position of the zoom lens is set to the telescopic side.

Therefore, for example, when a user sets the zoom position to the wide side so as to widen the projection light range on the screen, the size (i.e., the area of the projection light range) of the pattern image projected in the photographing image is correspondingly increased as shown in FIG. 6A or 7A. However, as mentioned above, when the zoom position is set to the wide side, the stripe element width Wq of the pattern image formed on the liquid crystal light valve 114 is correspondingly narrowed. Therefore, the stripe element width of the pattern image displayed on the screen is also narrowed. Accordingly, the size of the projected pattern image is increased in the photographing image. However, the width Wp of each stripe element constituting this pattern image is not widened, but is approximately constantly held at a predetermined desirable width.

On the other hand, when the user sets the zoom position to the telescopic side so as to narrow the projection light range on the screen, the size (i.e., the area of the projection light range) of the pattern image projected in the photographing image is correspondingly reduced as shown in FIG. 6B or 7B. However, as mentioned above, when the zoom position is set to the telescopic side, the stripe element width Wq of the pattern image formed on the liquid crystal light valve 114 is correspondingly widened. Therefore, the stripe element width of the pattern image displayed on the screen is also widened. Accordingly, the size of the projected pattern image is reduced in the photographing image. However, the width Wp of each stripe element constituting this pattern image is not narrowed, but is approximately held at a predetermined desirable width.

Thus, in this exemplary embodiment, the width Wp of each stripe element constituting the pattern image projected in the photographing image is approximately constantly held at a predetermined desirable width irrespective of the change of the zoom position of the zoom lens 116.

Accordingly, even when the zoom position is located on the wide side and the telescopic side, the width Wp of each stripe element constituting the pattern image projected in the photographing image is moderately narrow and becomes a predetermined desirable width. Therefore, the gradation waveform showing a spatial change of the gradation value of each picture element arranged along the X-X direction in FIG. 6A or 6B or the Y-Y direction in FIG. 7A or 7B moderately becomes high in spatial frequency (i.e., the waveform period moderately becomes short) as shown in FIG. 12B. Therefore, when it is focused, the gradation amplitude is large as shown in FIG. 12A. However, when the focus is slightly shifted, the gradation amplitude becomes small as shown in FIG. 12B. Therefore, the focus degree of the pattern image on the screen can be precisely grasped by detecting this gradation amplitude. Accordingly, an appropriate focus adjustment can be made on the basis of the gradation amplitude.

4. Concrete Examples:

Here, with respect to the gradation amplitude obtained from the photographing image, a more concrete explanation using the drawings will be made with respect to the difference between a case in which the pattern image for an adjustment formed on the liquid crystal light valve is always constant as in the related art, and a case in which the width of the stripe element in the pattern image for an adjustment formed on the liquid crystal light valve is changed in accordance with the zoom position of the zoom lens as in this exemplary embodiment.

Figure 8A:
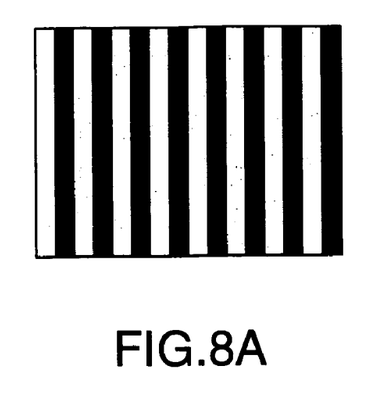
FIGS. 8A-C are schematics showing the pattern image formed on the liquid crystal light valve, the photographing image and a gradation waveform obtained from this photographing image in the related art case.
Figure 8B:
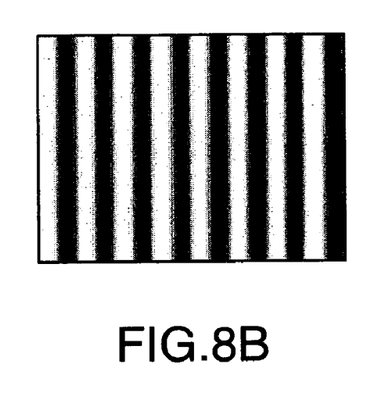
Figure 8C:
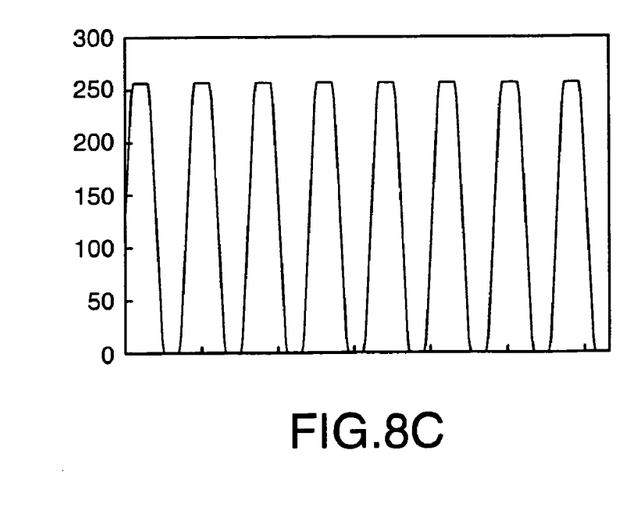
Figure 9A:
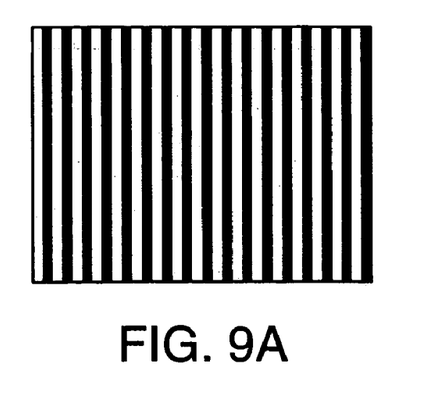
FIGS. 9A-C are schematics showing the pattern image formed on the liquid crystal light valve, the photographing image and the gradation waveform obtained from this photographing image in one exemplary embodiment of the present invention.
Figure 9B:
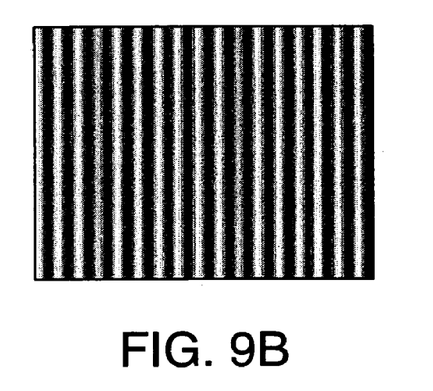
Figure 9C:
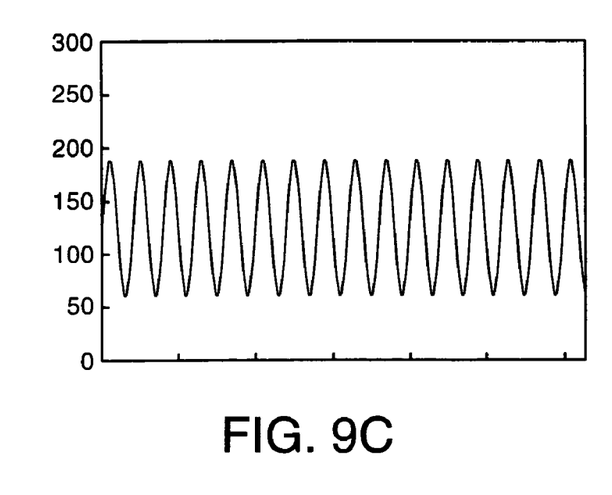

FIGS. 8A-C are schematics showing the pattern image formed on the liquid crystal light valve, the photographing image, and the gradation waveform obtained from this photographing image as in the related art. FIGS. 9A-C are schematics showing the pattern image formed on the liquid crystal light valve, the photographing image, and the gradation waveform obtained from this photographing image in this exemplary embodiment. In these figures, each of FIGS. 8A and 9A show the pattern image formed on the liquid crystal light valve. Each of FIGS. 8B and 9B show the projection light range in the photographing image. Each of FIGS. 8C and 9C show the gradation waveform obtained from the photographing image.

The pattern image for an adjustment formed on the liquid crystal light valve is, in the related art, always constant even when the zoom position of the zoom lens is changed. Therefore, as shown in FIG. 8C, there is a case in which no gradation amplitude is reduced in the gradation waveform obtained from the photographing image even when the focus is shifted on the screen. In contrast to this, in this exemplary embodiment, when the zoom position of the zoom lens is changed, the width of the stripe element in the pattern image for an adjustment formed on the liquid crystal light valve is changed in accordance with this change. Therefore, when the focus is shifted on the screen, the gradation amplitude is reduced in the gradation waveform obtained from the photographing image as shown in FIG. 9C.

5. Effects of this Exemplary Embodiment:

As explained above, in this exemplary embodiment, when the size of the projection light range on the screen is changed by changing the zoom position of the zoom lens 116, the width Wp of each stripe element constituting the pattern image is approximately constantly held at a predetermined desirable width even when the size of the pattern image for an adjustment projected in the photographing image is changed. Therefore, an appropriate focus adjustment can be made on the basis of the gradation amplitude obtained from this photographing image.

6. Modified Examples:

Exemplary embodiments of the present invention are not limited to the above exemplary embodiments and exemplary embodiment modes, but can be embodied in various modes within the scope not departing from the spirit and gist of exemplary embodiments of the present invention.

6-1. Modified Example 1:

In the above exemplary embodiments, the CPU 120 derives the stripe element width Wq according to the zoom amount Z by referring to the stripe element width table stored to the stripe element width table storing section 109. However, exemplary embodiments of the present invention are not limited to this case. The CPU 120 may also calculate the stripe element width Wq by a direct calculation, etc. on the basis of the zoom amount Z.

6-2. Modified Example 2:

In the above exemplary embodiments, the image of a longitudinal stripe or a transversal stripe constructed by arranging plural stripe elements formed by a white color band and a black color band is used as the pattern image for an adjustment. However, exemplary embodiments of the present invention are not limited to this case. For example, the stripe element may be also constructed by the band of a color except for the white color and the black color, and may be also constructed by the band of three colors or more. Further, as the pattern image for an adjustment, an image constructed by arranging plural other image elements may be also used in addition to the stripe element. In this case, on the basis of the detected zoom amount, the size of the image element according to this zoom amount is derived and the pattern image for an adjustment may be also corrected on the basis of the derived size of this image element.

6-3. Modified Example 3:

In the above exemplary embodiments, the zoom amount is set to "0" when the zoom position is located in the most end portion of the wide side. The zoom amount is set to "255" when the zoom position is located in the most end portion of the telescopic side. However, the zoom amount in exemplary embodiments of the present invention are not limited to these values. When the zoom position is located in the most end portion of the telescopic side, the zoom amount may be also set to a value except for "255". Further, when the zoom position is located in the most end portion of the telescopic side, the zoom amount may be also set to "0". The zoom amount may be also set to have an offset value. Further, a value except for the zoom amount may be also used if this value is a value corresponding to the zoom position of the zoom lens 116.

6-4. Modified Example 4:

The liquid crystal light valve 114 is used as an electro-optic device in the projector 100, but exemplary embodiments of the present invention are not limited to this case. It is possible to utilize various devices for forming an image on the basis of an image signal and emitting light modified in accordance with this formed image. For example, a DMD (digital micro mirror device) (trademark of TI corporation) may be used and a CRT, a plasma display panel, etc. may be also used.

What is claimed is:

1. A projector to display an image by projecting projection light to a projection object, the projector comprising:

an image forming section to form an image constructed by arranging plural image elements as a pattern image for the display in the projection object;

a zoom lens to change the size of a projection light range projected by the projection light;

a zoom lens position detecting section to detect a zoom position of the zoom lens;

a control section; and a photographing section to photograph the projection object;

the control section obtaining the zoom position detected by the zoom lens position detecting section, and a size of the image element in the pattern image formed in the image forming section being changed in accordance with the obtained zoom position, and the control section changing the width of a stripe element in the pattern image formed in the image forming section in accordance with the obtained zoom position so that the width of the stripe element in a photographing image photographed by the photographing section may be held approximately constant at a predetermined desirable size when the image element is a stripe element constructed by a band of a first color and a band of a second color and the pattern image being an image of a stripe constructed by arranging a plurality of the stripe elements.

2. The projector according to claim 1, the projector further comprising:

a focus lens to focus the image displayed in the projection object, and the control section deriving a gradation amplitude from a gradation waveform showing a spatial change of a gradation value of each picture element arranged along a predetermined direction in the photographing image photographed and obtained by the image pickup section when the pattern image formed in the image forming section is displayed in the projection object, and the control section controls the operation of the focus lens on a basis of the derived gradation amplitude.

3. A pattern image display method for displaying a pattern image constructed by arranging plural image elements in a projection object in a projector which has a zoom lens to display the image by projecting projection light to a projection object and change a size of a projection light range projected by the projection light and also has a photographing section to photograph the projection object;

the pattern image display method, comprising:

(a) detecting a zoom position of the zoom lens;

(b) deriving a size of the image element in the pattern image to be formed on a basis of the detected zoom position;

(c) forming the pattern image constructed by the image element having the size on the basis of the derived size of the image element;

(d) displaying the formed pattern image in the projection object;

(e) deriving the width of a stripe element in the pattern image to be formed on the basis of the detected zoom position so that the width of the stripe element in a photographing image photographed by the photographing section may be held approximately constant at a predetermined desirable size, when the image element is a stripe element constructed by a band of a first color and a band of a second color and the pattern image is an image of a stripe constructed by arranging a plurality of the stripe elements; and (f) forming pattern image constructed by the stripe element having this width on a basis of the derived width of the stripe element.

* * * * *